(12) United States Patent
Lim et al.

(10) Patent No.: US 12,811,066 B2
(45) Date of Patent: Nov. 24, 2026

US012811066B2

(54) CERAMIC CAPACITOR AND MANUFACTURING METHOD THEREOF

(71) Applicant: AMOTECH CO., LTD., Incheon (KR)

(72) Inventors: Byungguk Lim, Incheon (KR); Yunsuk Choi, Incheon (KR); Jaeyong Song, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 228 days.

(21) Appl. No.: 18/723,391

(22) PCT Filed: Dec. 1, 2022

(86) PCT No.: PCT/KR2022/019361

§ 371 (c)(1),
(2) Date: Jun. 21, 2024

(87) PCT Pub. No.: WO2023/121043

PCT Pub. Date: Jun. 29, 2023

(65) Prior Publication Data

US 2025/0166921 A1 May 22, 2025

(30) Foreign Application Priority Data

Dec. 22, 2021 (KR) ........................ 10-2021-0184442
Dec. 22, 2021 (KR) ........................ 10-2021-0184452

(51) Int. Cl.
*H01G 4/30* (2006.01)
*H01G 4/232* (2006.01)

(52) U.S. Cl.
CPC ............... *H01G 4/30* (2013.01); *H01G 4/232* (2013.01)

(58) Field of Classification Search
CPC ............ H01G 4/30; H01G 4/232; H01G 4/12; H01G 13/00; H01G 4/012; H01G 4/228; H01G 4/005; H01G 4/2325
See application file for complete search history.

(56) References Cited

U.S. PATENT DOCUMENTS 8,917,490 B2 12/2014 Kim et al.
9,576,732 B2 * 2/2017 Lee ........................ H01G 2/065
(Continued)

FOREIGN PATENT DOCUMENTS

JP H01-152712 A 6/1989
JP 2018-018845 A 2/2018
(Continued)

OTHER PUBLICATIONS

KR Office Action dated Apr. 9, 2024 as received in Application No. 10-2021-0184442.
(Continued)

*Primary Examiner* — Timothy J. Dole
*Assistant Examiner* — Esther N Lian
(74) *Attorney, Agent, or Firm* — Maschoff Brennan

(57) ABSTRACT

The present invention relates to a ceramic capacitor and a manufacturing method thereof. The ceramic capacitor includes: a ceramic body including a plurality of dielectric layers and an internal electrode in which first external electrodes are disposed on both sides of each of the top surface and the bottom surface of the ceramic body; and second external electrodes which are disposed on at least a portion of each of first and second cross sections facing each other in a longitudinal direction of the ceramic body and extend to the top and bottom surfaces to be in contact with the first external electrodes, respectively, wherein each of the second external electrodes has a short distance from each of the first and second cross sections to one end thereof than each of the first external electrodes.

18 Claims, 12 Drawing Sheets

(56) References Cited

U.S. PATENT DOCUMENTS

| | | | | |
|---|---|---|---|---|
| 11,335,509 | B2 | 5/2022 | Sasabayashi et al. | |
| 2004/0183147 | A1 * | 9/2004 | Togashi | H05K 3/3426 257/414 |
| 2016/0042869 | A1 * | 2/2016 | Park | H01G 4/30 29/25.42 |
| 2016/0086734 | A1 * | 3/2016 | Park | H01G 4/0085 361/301.4 |
| 2016/0088725 | A1 * | 3/2016 | Park | H01G 4/30 361/301.4 |
| 2017/0345569 | A1 | 11/2017 | Sakatsume et al. | |
| 2018/0025844 | A1 * | 1/2018 | Sato | H01G 4/008 361/321.2 |
| 2019/0362894 | A1 * | 11/2019 | Choi | H01G 4/30 |
| 2023/0170105 | A1 * | 6/2023 | Esaki | H01G 9/042 252/520.3 |

FOREIGN PATENT DOCUMENTS

| | | | |
|---|---|---|---|
| JP | 2020-136553 | A | 8/2020 |
| KR | 10-2009-0037676 | A | 4/2009 |
| KR | 10-2012-0056549 | A | 6/2012 |
| KR | 10-2013-0040423 | A | 4/2013 |
| KR | 10-2016-0035491 | A | 3/2016 |
| KR | 10-2017-0135664 | A | 12/2017 |

OTHER PUBLICATIONS

KR Office Action dated Apr. 9, 2024 as received in Application No. 10-2021-0184452.

* cited by examiner

[FIG. 1]
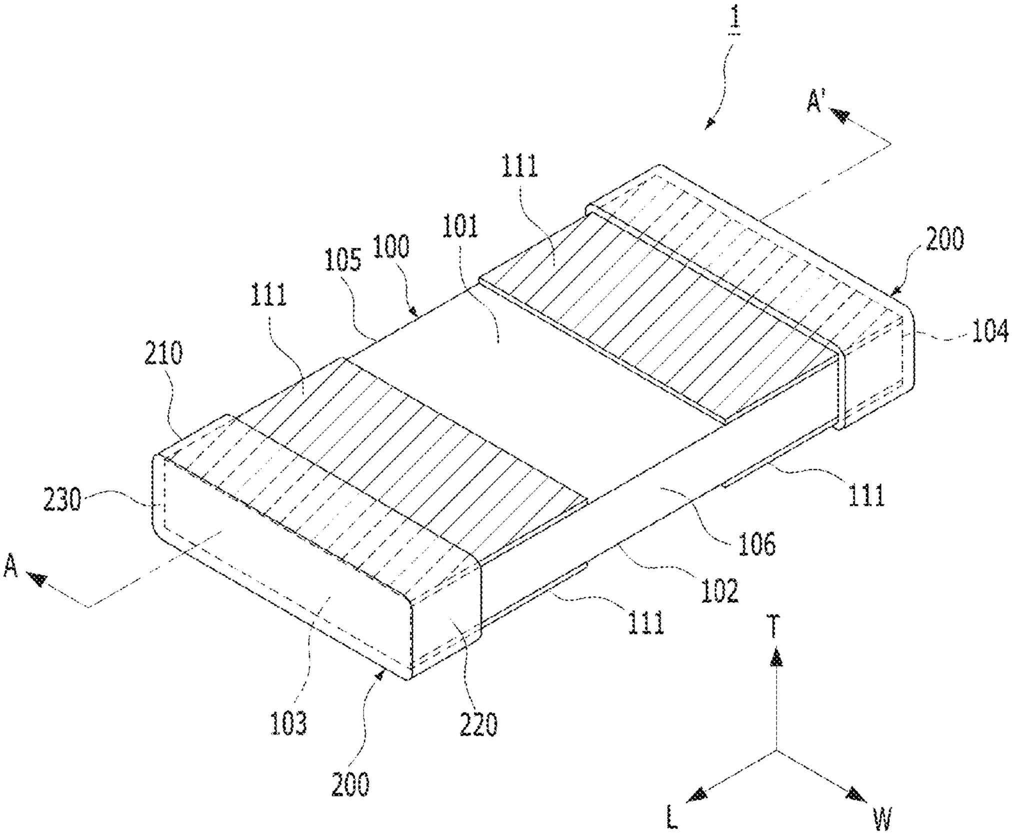

[FIG. 2]
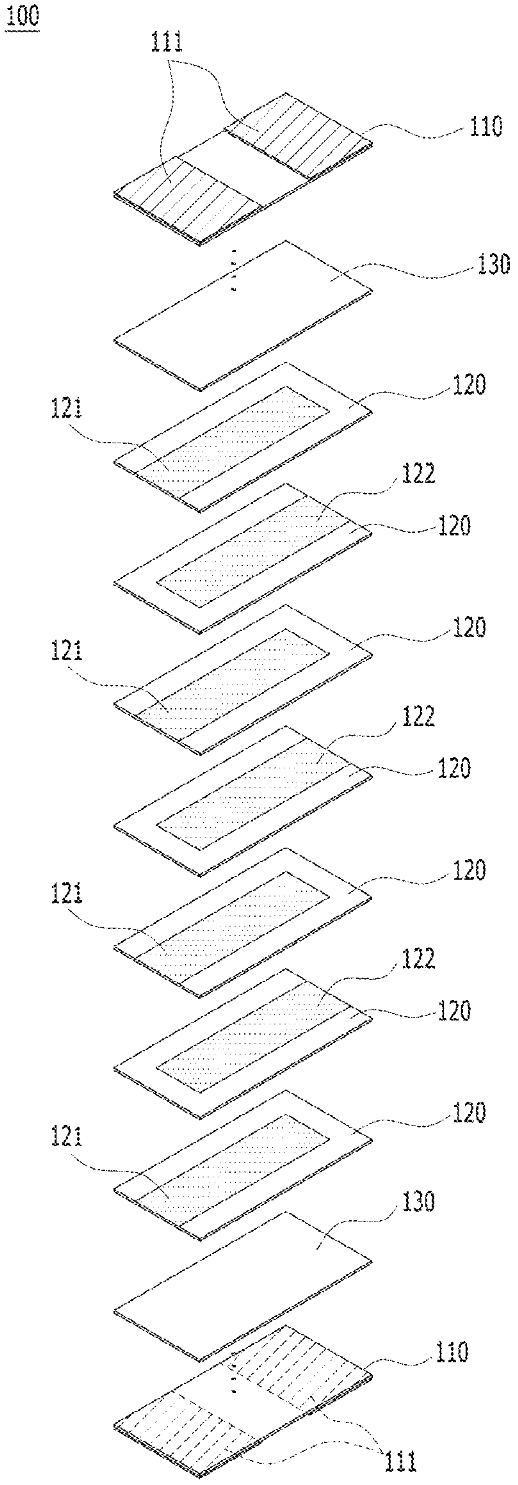

[FIG. 3]
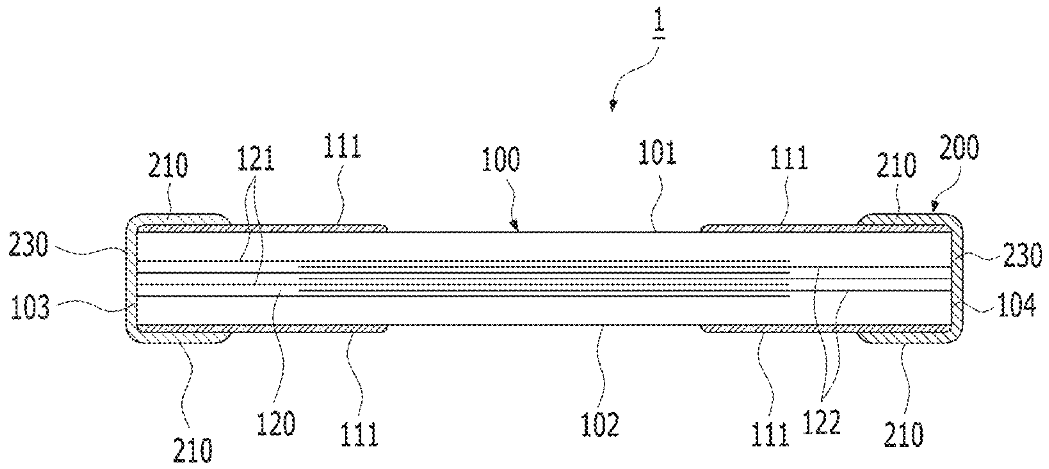

[FIG. 4]
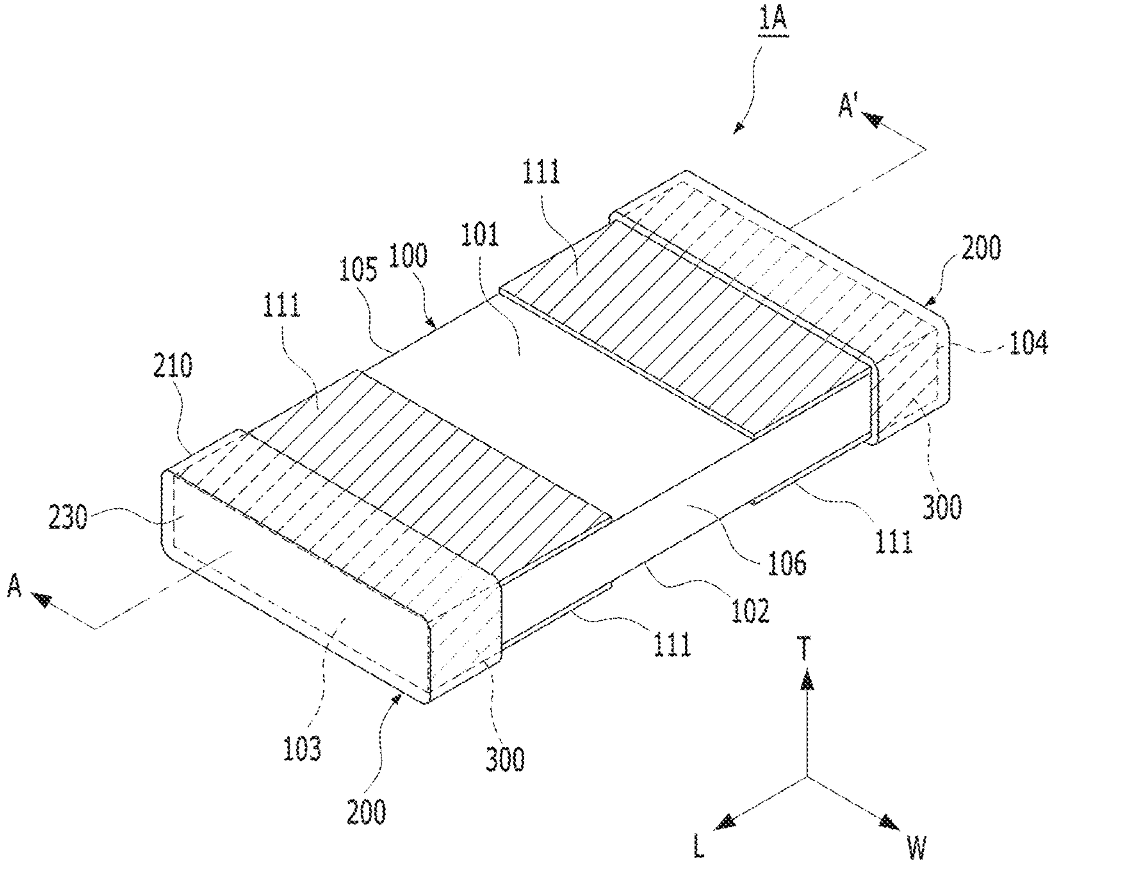

[FIG. 5]
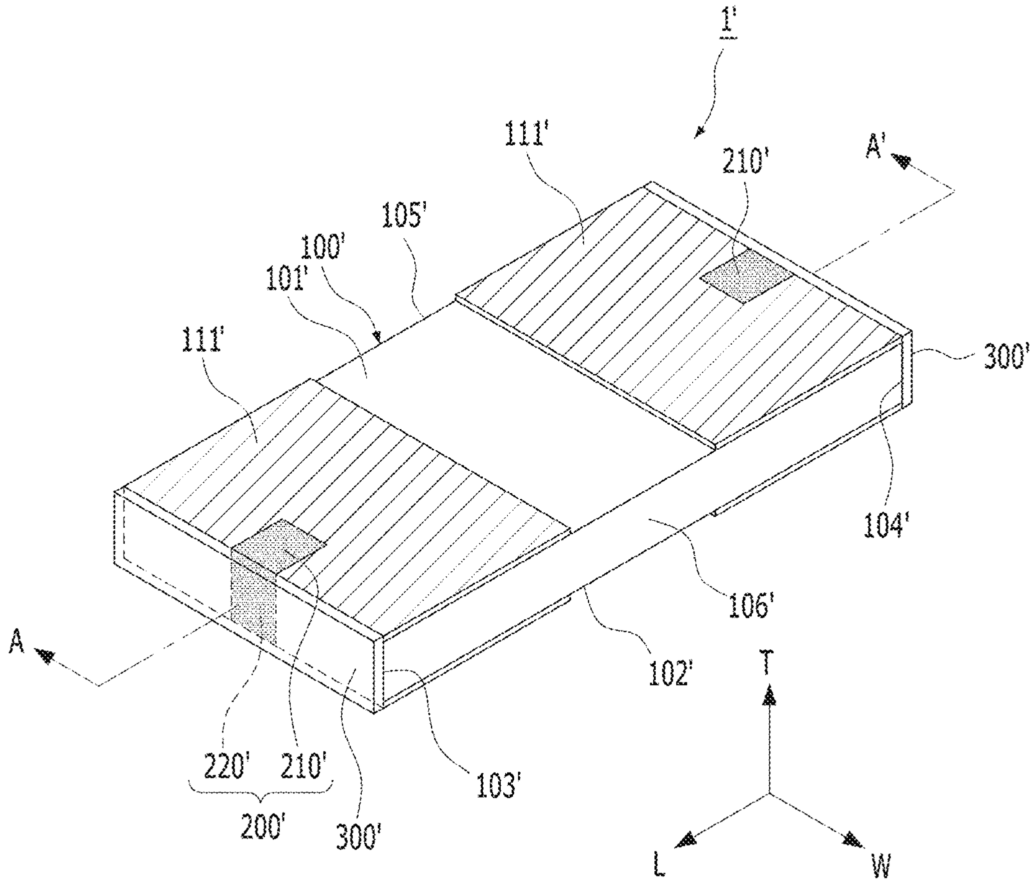

[FIG. 6]
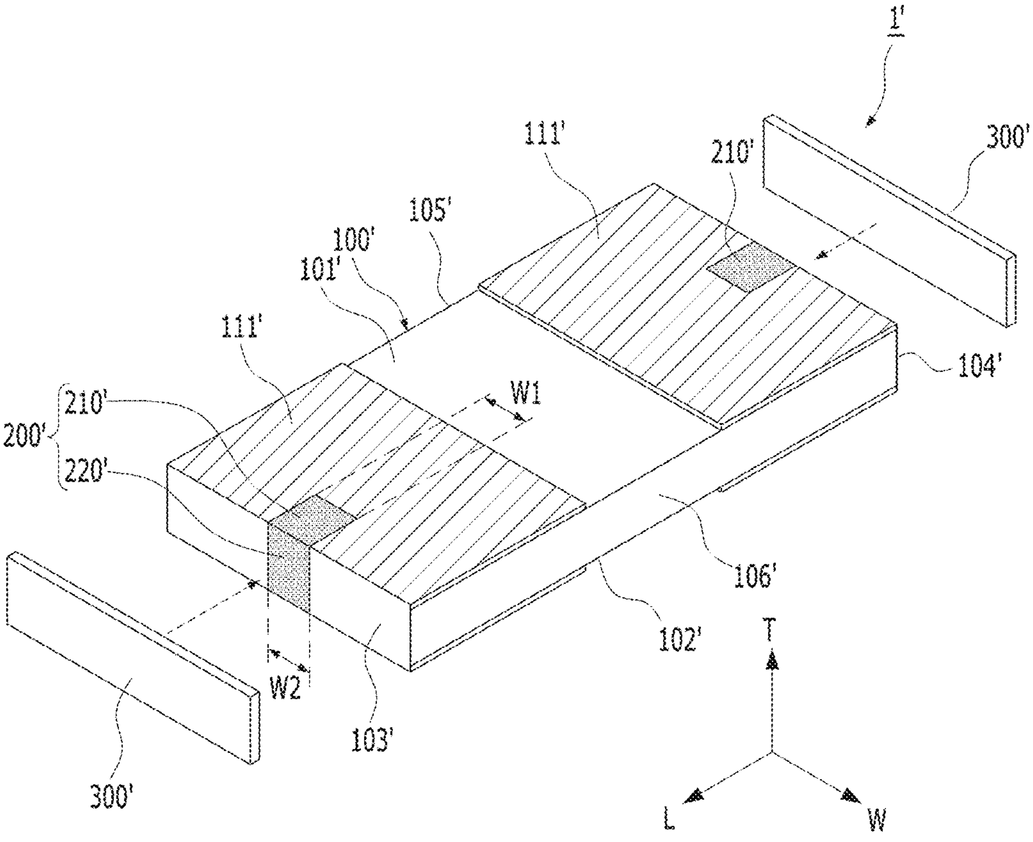

[FIG. 7]
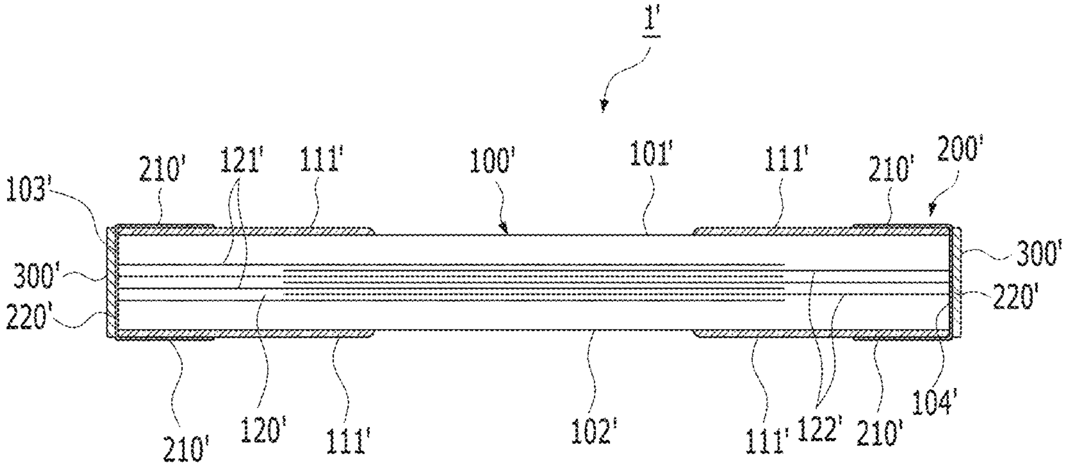

[FIG. 8]
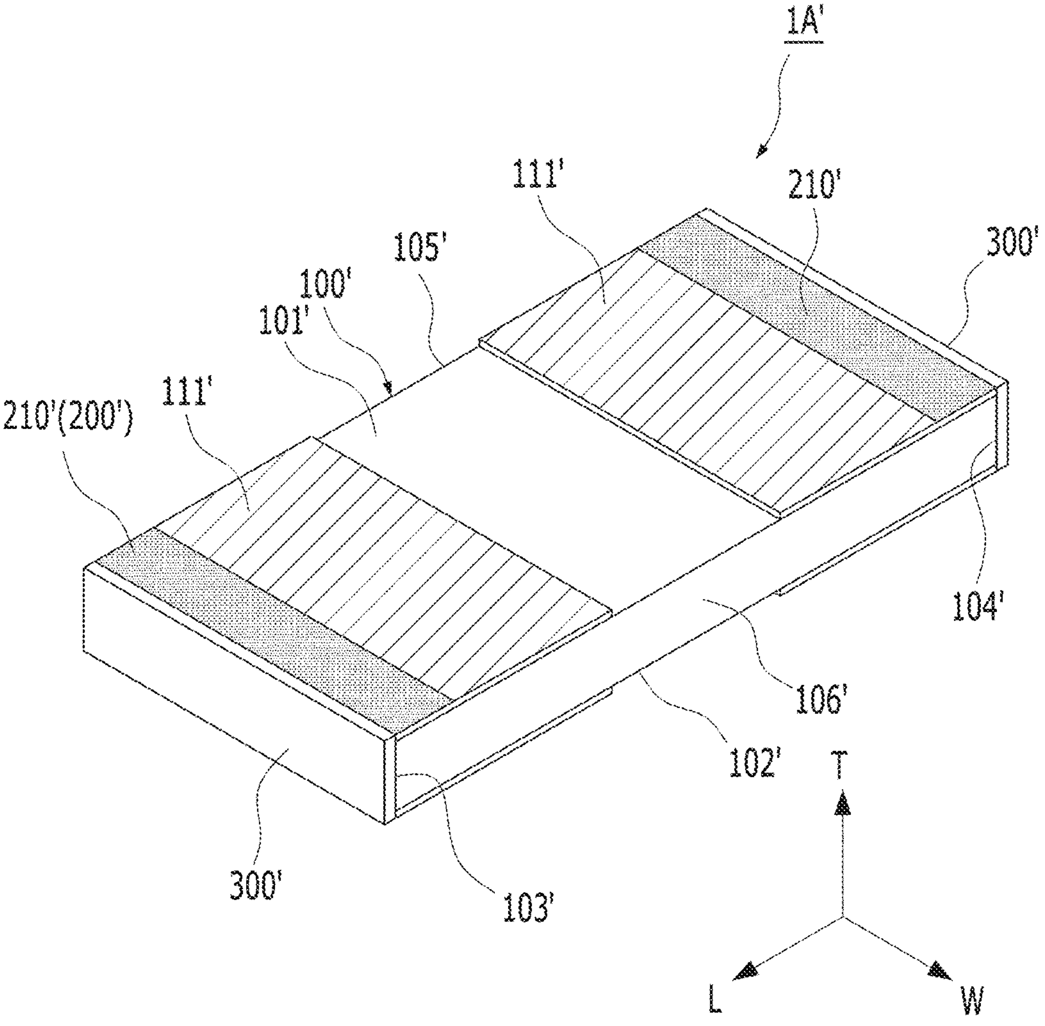

[FIG. 9]
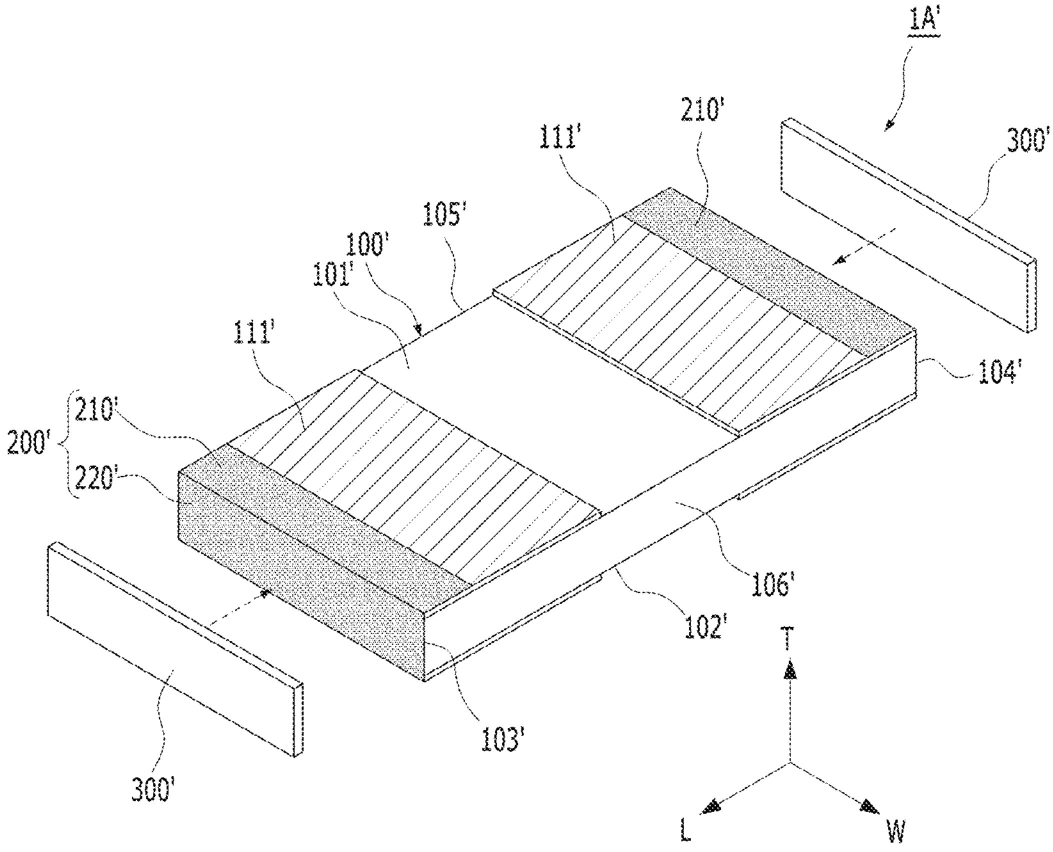

[FIG. 10]
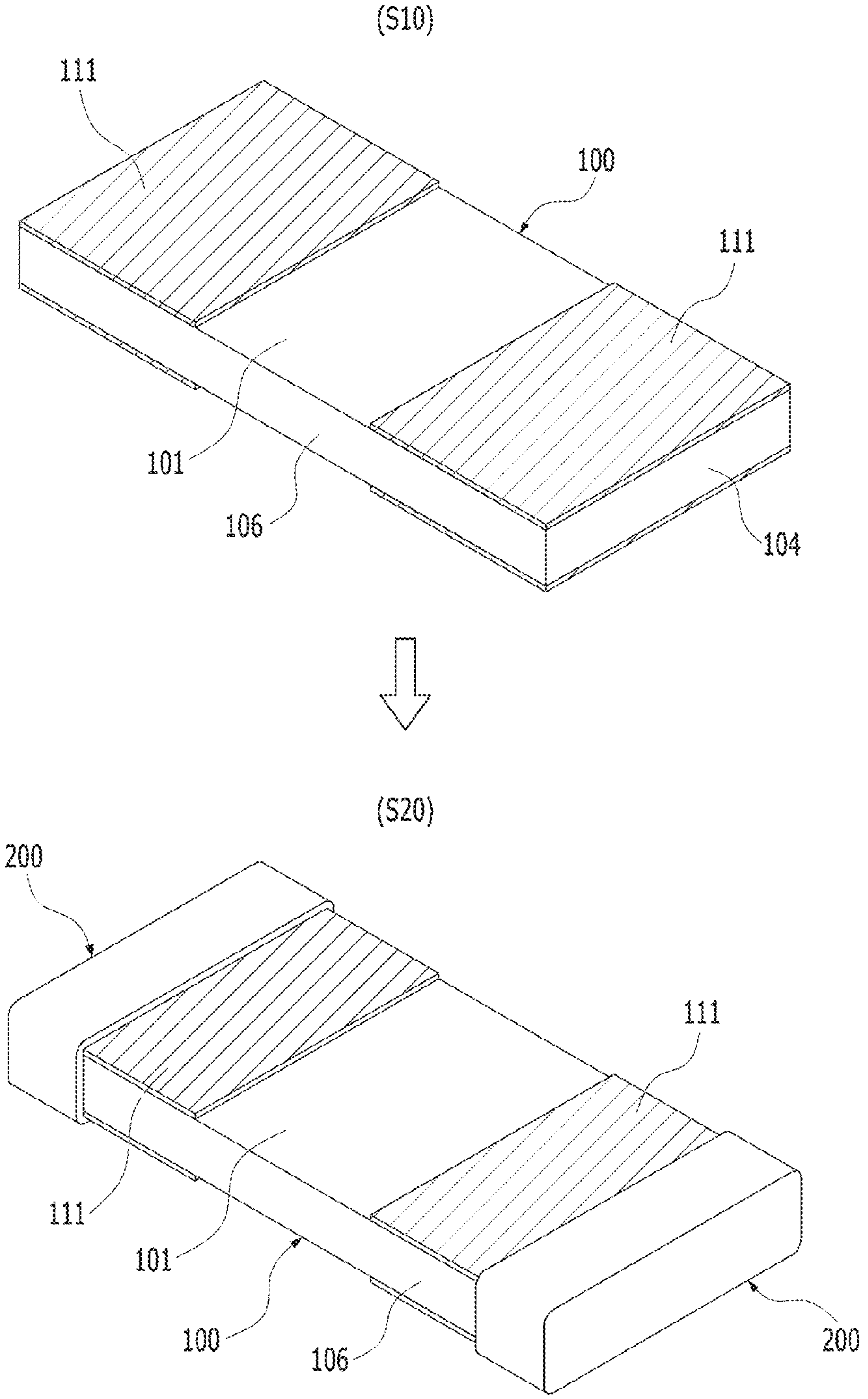

[FIG. 11]
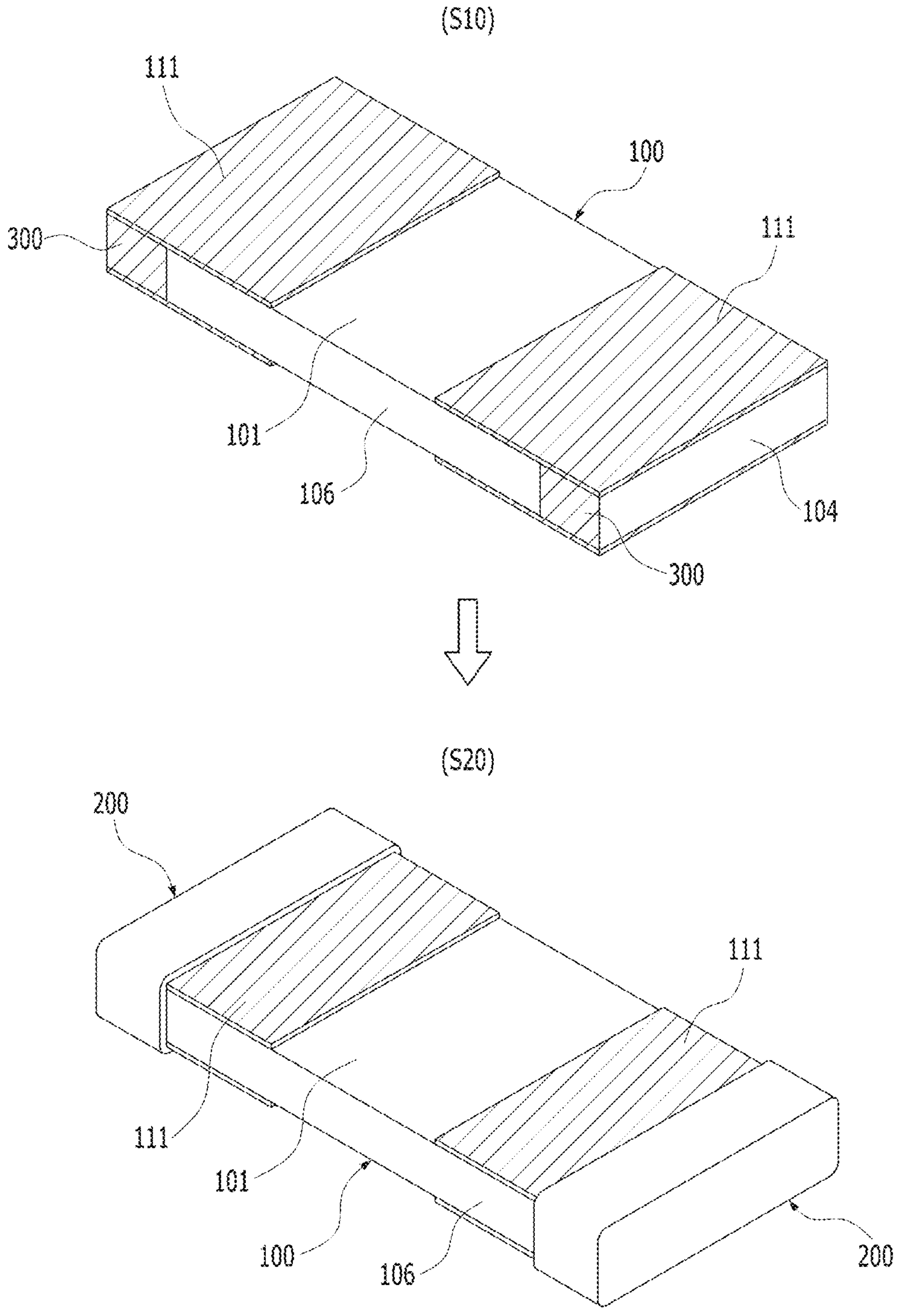

[FIG. 12]
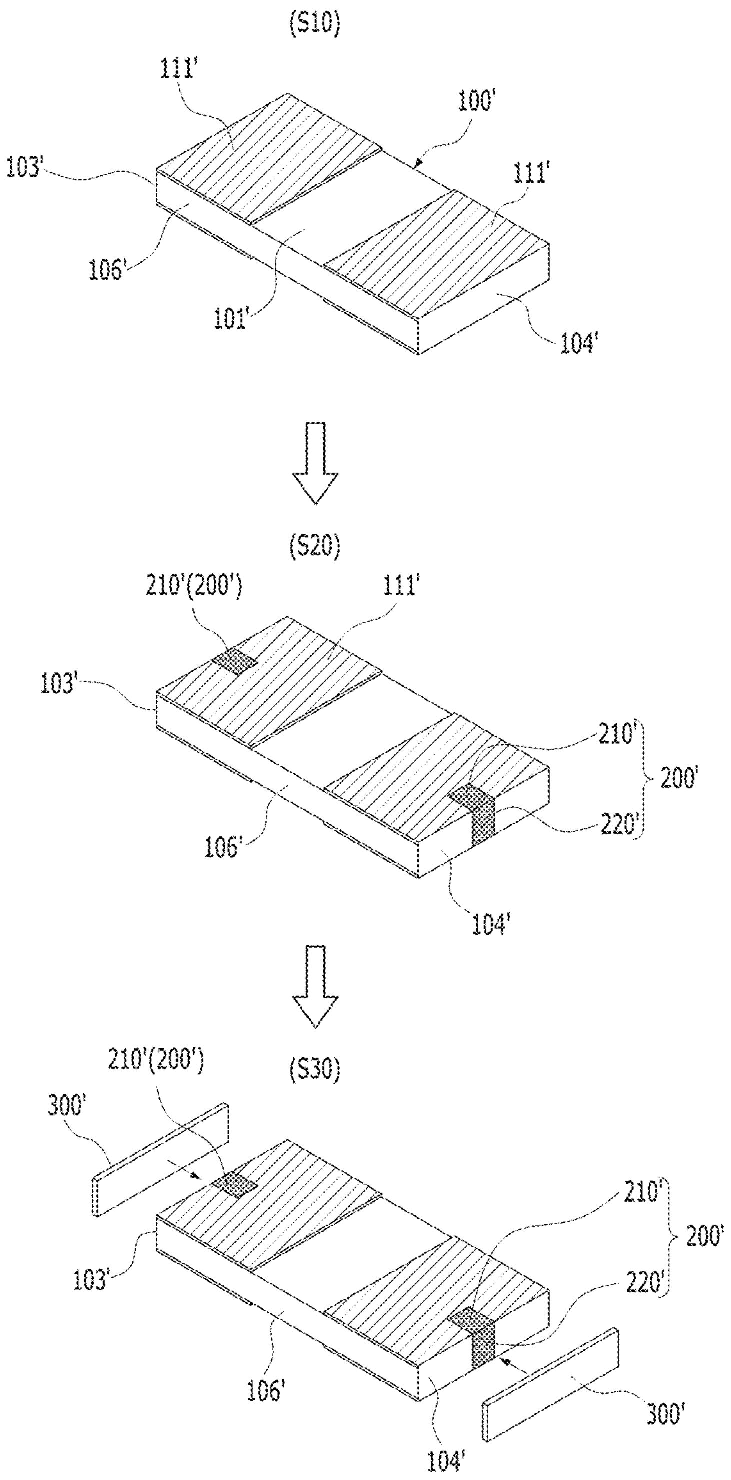

CERAMIC CAPACITOR AND MANUFACTURING METHOD THEREOF

TECHNICAL FIELD

The present disclosure relates to a ceramic capacitor and a manufacturing method thereof, and more specifically, to a multilayer chip capacitor applied to electronic devices and a manufacturing method thereof.

BACKGROUND ART

Capacitors are used to protect components by storing electricity when there are the components whose voltage needs to be maintained at a constant level and supplying electricity evenly and stably as needed by the components, reduce noise in electronic devices, or pass only an AC signal in a mixture of DC and AC signals.

Recently, as electronic devices have become smaller, lighter, more digital, and have higher frequencies, a multilayer chip capacitor (MLCC) formed by stacking several layers of ceramic as a dielectric between electrodes is being widely used. The MLCC helps electronic devices operate well by removing noise that affects active elements such as semiconductors and ICs in electronic circuits classified into active and passive elements. Noise refers to signals that interfere with operations of the electronic devices.

A ceramic capacitor is composed of a dielectric, an internal electrode, and an external electrode. In the ceramic capacitor, since charges are accumulated between internal electrodes face each other, it is possible to achieve miniaturization and high capacity by stacking several layers of the internal electrodes in a limited space. At high frequencies at which a fast response is required, low-capacity ceramic capacitors having a fewer number of layers of internal electrodes are more suitable than high-capacity ceramic capacitors.

However, since the ceramic capacitor having a small number of stacked internal electrodes and a low height has a weak tensile strength, upon soldering to electrically connect external electrodes to a circuit board, cracks are likely to occur as stress is concentrated on the soldered area. When cracks occur in the ceramic capacitor, reliability can be degraded because the characteristics required from the ceramic capacitor are changed.

Matters described above in the background art are intended to help understanding of the background of the disclosure and may include matters not related to the known related art.

SUMMARY OF INVENTION

Technical Problem

The present disclosure has been made in efforts to solve the above problems and is directed to providing a ceramic capacitor capable of preventing a phenomenon in which stress is concentrated on both lower sides of a ceramic body upon bonding by soldering, thereby causing cracks and also suppressing a floating capacity generated between an external electrode and an internal electrode, and a manufacturing method thereof.

Solution to Problem

To achieve the object, a method of manufacturing a ceramic capacitor according to one embodiment of the present disclosure may include manufacturing a ceramic body including a plurality of dielectric layers and internal electrodes and having first external electrodes disposed at both sides of at least one of a top surface and a bottom surface, and forming a second external electrode disposed on at least a portion of each of a first cross section and a second cross section facing each other in a longitudinal direction of the ceramic body and extending to the top surface and the bottom surface to be in contact with the first external electrode, wherein in the forming of the second external electrode, the second external electrode may be formed to have a shorter distance between each of the first cross section and the second cross section and one end portion thereof than the first external electrode.

In the forming of the second external electrode, the second external electrode may be formed to surround the first cross section and the second cross section, and a perimetric surface of an edge adjacent to each of the first cross section and the second cross section.

The manufacturing of the ceramic body may include forming a stack including a plurality of first dielectric layers having the first external electrodes at both sides of one of top and bottom surfaces thereof, a plurality of second dielectric layers having internal electrodes disposed thereon, and a plurality of third dielectric layers formed of only a dielectric layer, and compressing, cutting, and sintering the stack.

In the forming of the stack, the first dielectric layer on which the first external electrodes are disposed at both sides of the top surface thereof may be disposed on an uppermost portion, and the first dielectric layer on which the first external electrodes are disposed at both side of the bottom surface thereof is disposed on a lowermost portion.

In the forming of the stack, the plurality of second dielectric layers on which the internal electrodes are disposed may be disposed between the first dielectric layers, and the plurality of third dielectric layers formed of only the dielectric layer are disposed between the first dielectric layer and the second dielectric layer.

The manufacturing of the ceramic body may further include forming side electrodes at both sides of each of the first side surface and the second side surface facing each other in a width direction, and in the forming of the second external electrode, the second external electrode may extend to the perimetric surface as much as a length covering the side electrode.

In the sintering, after the stack is compressed and cut, side electrodes may be formed at both sides of each of a pair of side surfaces facing each other in a width direction, and the stack and the side electrode may be sintered at the same time, and in the forming of the second external electrode, the second external electrode may extend to the perimetric surface as much as a length covering the side electrode.

In the forming of the stack, each of the first dielectric layers on which the first external electrode is disposed may be formed by printing an electrode material that is one of Ag and Cu, or a mixture thereof at both sides of one of top and bottom surfaces of a ceramic sheet.

Meanwhile, the method of manufacturing the ceramic capacitor according to another embodiment of the present disclosure may further include forming a third external electrode to cover each of the first cross section and the second cross section on which the second external electrode is disposed.

The forming of the third external electrode may include forming the third external electrode by attaching a metal plate on each of the first cross section and the second cross section using a conductive adhesive.

The forming of the third external electrode may include forming the third external electrode by depositing an electrode material on each of the first cross section and the second cross section in a sputtering method.

Meanwhile, a ceramic capacitor according to one embodiment of the present disclosure may include a ceramic body including a plurality of dielectric layers and internal electrodes and having first external electrodes disposed at both sides of at least one of a top surface and a bottom surface, and a second external electrode disposed on at least some of each of a first cross section and a second cross section facing each other in a longitudinal direction of the ceramic body and extending to the top surface and the bottom surface to be in contact with the first external electrode, wherein the second external electrode may be formed to have a shorter distance between each of the first cross section and the second cross section and one end portion thereof than the first external electrode.

Here, the second external electrode may be formed to surround the first cross section and the second cross section, and a perimetric surface of an edge adjacent to each of the first cross section and the second cross section.

The second external electrode may include a first part disposed on each of the top surface and the bottom surface to be in contact with the first external electrode, a second part formed subsequent to the first part and disposed on each of a first side surface and a second side surface facing each other in a width direction of the ceramic body, and a third part formed subsequent to the second part and disposed on each of the first cross section and the second cross section, and the first part and the second part may have the same width in a longitudinal direction of the ceramic body.

In addition, the ceramic body may further include side electrodes disposed at both sides of each of a first side surface and a second side surface facing each other in a width direction, and the second external electrode may extend to the perimetric surface as much as a length covering the side electrode.

In addition, an interval between the first external electrodes in a longitudinal direction of the ceramic body may be shorter than an interval between the second external electrodes.

Meanwhile, the ceramic capacitor may further include a third external electrode formed to cover each of the first cross section and the second cross section on which the second external electrode is disposed.

The second external electrode may be disposed on a central portion of the ceramic body in a width direction on each of the first cross section and the second cross section.

The second external electrode may include a first part disposed on each of the top surface and the bottom surface to be in contact with the first external electrode, and a second part formed subsequent to the first part and disposed on each of the first cross section and the second cross section, and the first part and the second part may have the same length in a width direction of the ceramic body.

The second external electrode may have the same length in the width direction of the ceramic body as the first external electrode.

Advantageous Effects of Invention

According to the present disclosure, since the first external electrode may be formed by being printed on the ceramic sheet, the formation location and size of the first external electrode can be accurately controlled, and the interval between the first external electrodes can be accurately controlled, thereby reducing the deviation of the capacitance.

In addition, according to the present disclosure, it is possible to prevent the occurrence of cracks by arranging the first external electrode having a great area at both sides of at least one surface of the top and bottom surfaces of the ceramic body to reinforce the intensity of the capacitor.

In addition, according to the present disclosure, since the second external electrode is formed to have a shorter distance between each of the first section and the second section and one end portion thereof than the first external electrode, it is possible to reduce the area of the second external electrode facing the internal electrode, thereby suppressing the generation of the stray capacitance and reducing the deviation of the capacitance.

In addition, according to the present disclosure, by arranging the side electrode at both sides of each of the first side surface and the second side surface facing each other in the width direction of the ceramic body, the length of the second external electrode extending to the perimetric surface of the ceramic body can be controlled, thereby accurately controlling the location and size of the second external electrode to be formed within the range in which the stray capacitance can be suppressed.

In addition, according to the present disclosure, since the third external electrode is formed to cover each of the first section and the second section in the state in which the second external electrode is disposed on each of the first section and the second section and the top and bottom surfaces thereof, the external electrode can be easily formed not to extend to the first and second side surfaces, the occurrence of the stray capacitance can be suppressed, and the deviation of the capacitance can be reduced.

In addition, according to the present disclosure, since the third external electrode may be formed by attaching the metal plate to each of the first section and the second section using the conductive adhesive, the third external electrode provided as the metal plate may serve to support the first and second sections of the ceramic body, thereby reducing vibrations caused by the piezoelectric phenomenon of the capacitor.

In addition, according to the present disclosure, since the third external electrode may be formed by depositing the electrode material on each of the first and second sections in the sputtering method, the composition ratio and thickness of the third external electrode can be easily adjusted.

BRIEF DESCRIPTION OF DRAWINGS

FIG. 1 is a perspective view showing a ceramic capacitor according to one embodiment of the present disclosure.

FIG. 2 is an exploded perspective view showing a ceramic body of the ceramic capacitor according to one embodiment of the present disclosure.

FIG. 3 is a cross-sectional view along line A-A' in FIG. 1.

FIG. 4 is a perspective view showing a ceramic capacitor having a different ceramic body according to a modified example of one embodiment of the present disclosure.

FIG. 5 is a perspective view showing a ceramic capacitor according to another embodiment of the present disclosure.

FIG. 6 is a perspective view showing a state in which a third external electrode is disassembled from FIG. 5.

FIG. 7 is a cross-sectional view along line A-A' in FIG. 5.

FIG. 8 is a perspective view showing a ceramic capacitor having a different second external electrode according to a modified example of another embodiment of the present disclosure.

FIG. 9 is a perspective view showing a state in which a third external electrode is disassembled from FIG. 8.

FIG. 10 is a view for describing a method of manufacturing the ceramic capacitor according to one embodiment of the present disclosure.

FIG. 11 is a view for describing a method of manufacturing the ceramic capacitor having the different ceramic body according to the modified example of one embodiment of the present disclosure.

FIG. 12 is a view for describing a method of manufacturing a ceramic capacitor according to another embodiment of the present disclosure.

DESCRIPTION OF EMBODIMENTS

Hereinafter, exemplary embodiments according to the present disclosure will be described in detail with reference to the accompanying drawings.

The embodiments are provided to more completely describe the present disclosure to those skilled in the art, and the following embodiments may be modified in various different forms, and the scope of the present disclosure is not limited to the following embodiments. Rather, the embodiments are provided to make the disclosure more faithful and complete and fully convey the spirit of the present disclosure.

Terms used herein are intended to describe specific embodiments and are not intended to limit the present disclosure. In addition, in the present specification, singular forms may include plural forms unless the context clearly indicates otherwise.

In the description of the embodiment, when each layer (film), area, pattern, or structure is described as being formed "on" or "under" a substrate, each layer (film), area, pad, or patterns, "on" and "under" include both cases of being formed "directly" or "indirectly with other elements interposed therebetween." In addition, in principle, the reference for "above" or "under" each layer are based on the drawing.

The drawings are only intended to help understanding of the spirit of the present disclosure and should not be construed as limiting the scope of the present disclosure by the drawings. In addition, in the drawings, a relative thickness and length, or a relative size may be exaggerated for convenience and clarity of description.

FIG. 1 is a perspective view showing a ceramic capacitor according to one embodiment of the present disclosure, FIG. 2 is an exploded perspective view showing a ceramic body of the ceramic capacitor according to one embodiment of the present disclosure, FIG. 3 is a cross-sectional view along line A-A' in FIG. 1, and the drawings are merely intended to understand the spirit of the present disclosure and should not be construed as limiting the scope of the present disclosure by the drawings. In addition, in the drawings, a relative thickness and length, or a relative size may be exaggerated for convenience and clarity of description.

As shown in FIGS. 1 and 2, a ceramic capacitor 1 according to one embodiment of the present disclosure may include a ceramic body 100 and a second external electrode 200.

The ceramic body 100 may include a plurality of dielectric layers 110, 120, and 130 and internal electrodes 121 and 122, and a first external electrode 111 may be disposed at both sides of at least one of a top surface 101 and a bottom surface 102. The ceramic body 100 may be sintered after stacking the plurality of dielectric layers 110, 120, and 130, and dielectric layers adjacent to each other may be integrated to the extent that their boundaries may not be identified.

The ceramic body 100 may have a rectangular parallelepiped shape. Defining directions for clearly describing embodiments of the present disclosure, L, W, and T shown in FIG. 1 indicate a longitudinal direction, width direction, and thickness direction of the ceramic body 100, respectively.

In the ceramic body 100, the top surface 101 and the bottom surface 102 may be disposed to face each other in a stacking direction, that is, in the thickness direction T of the dielectric layer, first cross section 103 and a second cross section 104 may be disposed to face each other in the longitudinal direction L, and first and second side surfaces 105 and 106 may be disposed to face each other in the width direction W.

As shown in FIG. 2, the ceramic body 100 may be configured as a stack including a plurality of first dielectric layers 110 in which the first external electrodes 111 are disposed at both sides of one of the top surface 101 and the bottom surface 102, a plurality of second dielectric layers 120 on which the internal electrodes 121 and 122 are disposed, and a plurality of third dielectric layers 130 made of only a dielectric. Here, the number of stacks of each of the plurality of first to third dielectric layers 110, 120, and 130 may be selectively adjusted.

The first external electrode 111 may be disposed at both sides of at least one of the top surface 101 and the bottom surface 102 of the ceramic body 100. Here, the first dielectric layer 110 having the first external electrodes 111 formed at both sides of the top surface 101 may be disposed at the uppermost portion of the ceramic body 100, and the first dielectric layer 110 having the first external electrodes 111 formed at both sides of the bottom surface 102 may be disposed at the lowermost portion of the ceramic body 100.

The second dielectric layer 120 on which the internal electrodes 121 and 122 are disposed may be disposed between the first dielectric layers 110, and the third dielectric layer 130 formed of only a dielectric may be formed between the first dielectric layer 110 and the second dielectric layer 120. Here, the third dielectric layer 130 may be disposed to secure an appropriate interval between the first dielectric layer 110 and the second dielectric layer 120, thereby suppressing a stray capacitance generated between the first external electrode 111 disposed on the first dielectric layer 110 and the internal electrodes 121 and 122 disposed on the second dielectric layer 120.

A material of the dielectric forming the plurality of first to third dielectric layers 110, 120, and 130 may be barium titanate ($BaTiO_3$)-based ceramic having a high dielectric constant. In addition, a dielectric material forming the dielectric layer may use or additionally include (Ca, Zr)(Sr, Ti)$O_3$. However, since the capacitance is proportional to the dielectric constant of the dielectric, it is preferable to use $BaTiO_3$ that is the dielectric material having the high dielectric constant.

The first internal electrode 121 and the second internal electrode 122 are electrodes having different polarities and may be disposed on at least one surface of the second dielectric layer 120. The second dielectric layer 120 may be formed by printing or applying an internal electrode material to at least one surface of a ceramic sheet made of the dielectric material. For example, the first and second internal electrodes 121 and 122 may be formed by printing a conductive paste containing at least one of Cu, Ag, Pd, Pt, Au, and Ni on at least one surface of the ceramic sheet. In addition, the ceramic sheet may be manufactured through a molding process in which dielectric material powder, additive materials, etc. are uniformly mixed to create a slurry, and then the slurry is uniformly coated on a film.

Referring to FIGS. 2 and 3, the first and second internal electrodes 121 and 122 may be disposed to be alternately exposed through the first cross section 103 and the second cross section 104 in the ceramic body 100 with the second dielectric layer 120 interposed therebetween. Here, the first and second internal electrodes 121 and 122 are electrically insulated by the second dielectric layer 120 disposed in the middle, and a capacitance of the ceramic capacitor 1 is proportional to areas of the first and second internal electrodes 121 and 122 overlapping each other in the stacking direction of the second dielectric layer 120.

The first external electrode 111 disposed on the first dielectric layer 110 may be formed by printing an electrode material made of Ag, Cu, or a mixed metal thereof at both sides of one of the top and bottom surfaces of the ceramic sheet made of a dielectric material. The first external electrode 111 may be formed by a method such as stencil printing. The stencil printing includes forming the first external electrode 111 by arranging a stencil metal mask with patterned holes on one of the top and bottom surfaces of the ceramic sheet and screen-printing the electrode material.

In the case of conventional ceramic capacitors, an external electrode is formed by dipping both end portions of a ceramic body into paste, and the dipping method has a disadvantage in that it is difficult to accurately control a dipping depth. Therefore, it is difficult to accurately control the degree of the external electrode extending to a perimetric surface of the ceramic body, and it is difficult to accurately control the interval between the external electrodes disposed at both end portions of the ceramic body, resulting in a problem of deviation of capacitance.

On the other hand, since the ceramic capacitor 1 according to one embodiment of the present disclosure is formed by printing the first external electrode 111 on the ceramic sheet, the formation location and size of the first external electrode 111 may be controlled accurately. In addition, the interval between the first external electrodes 111 may also be controlled accurately, thereby reducing the deviation of capacitance.

It is preferable that the interval between the first external electrodes 111 in the longitudinal direction of the ceramic body 100 is shorter than the interval between the second external electrodes 200 to be described below. That is, the second external electrode 200 may be formed to have a shorter distance between each of the first cross section 103 and the second cross section 104 and one end portion thereof than the first external electrode 111.

As described above, the area of the first external electrode 111 is formed to be greater than the area of the second external electrode 200 to secure a tensile strength of the ceramic capacitor 1. Since the ceramic capacitor 1 having a low profile structure with a low height lacks strength, stress may be concentrated on both lower sides of the capacitor at which a load is concentrated when soldering to a board, thereby causing cracks. Therefore, by arranging the first external electrode 111 having a great area at both sides of at least one of the top surface 101 and the bottom surface 102 of the ceramic body 100, it is possible to reinforce the strength of the capacitor, thereby preventing the occurrence of cracks. In addition, when the interval between the first external electrodes 111 is formed narrow, a fringing capacitance is generated, which has an advantage of widening a bandwidth at high frequencies.

On the other hand, when the interval between the first external electrodes 111 is formed too narrow, the first external electrodes 111 conduct with each other or the stray capacitance between the first external electrode 111 and the internal electrodes 121 and 122 increases, and it is preferable that the first external electrodes 111 may be formed at a predetermined interval or more.

The second external electrode 200 may be disposed on at least a portion of the first cross section 103 and the second cross section 104 facing each other in the longitudinal direction of the ceramic body 100 and may extend to the top surface 101 and the bottom surface 102 to be in contact with the first external electrode 111. Here, the second external electrode 200 may be formed to surround the first cross section 103 and the second cross section 104 and a perimetric surface of an edge adjacent to each of the first cross section 103 and the second cross section 104.

As shown in FIGS. 1 and 3, the second external electrode 200 may include a first part 210, a second part 220, and a third part 230. The first part 210 is a part disposed on each of the top surface 101 and the bottom surface 102 to be in contact with the first external electrode 111. The second part 220 may be formed subsequent to the first part 210 and may be disposed on each of the first side surface 105 and the second side surface 106 facing each other in the width direction of the ceramic body 100. The third part 230 may be formed subsequent to the second part 220 and disposed on each of the first cross section 103 and the second cross section 104.

That is, the first part 210 of the second external electrode 200 is a part that covers the first external electrodes 111 disposed at both sides of the top surface 101 and the bottom surface 102 of the ceramic body 100, the second part 220 of the second external electrode 200 is a part that covers the first side surface 105 and the second side surface 106 of the ceramic body 100, and the third part 230 of the second external electrode 200 is a part that covers the first cross section 103 and the second cross section 104 of the ceramic body 100. Here, the first part 210 and the second part 220 disposed on the perimetric surface of the edge, that is, the top surface 101, the bottom surface 102, the first side surface 105, and the second side surface 106 have the same width in a longitudinal direction L of the ceramic body 100. That is, lengths of the second external electrode 200 extending to the top surface 101, the bottom surface 102, the first side surface 105, and the second side surface 106 of the ceramic body 100 are the same.

The second external electrode 200 may be formed to have a smaller area than the first external electrode 111 on the perimetric surfaces 101, 102, 105, and 106 of the ceramic body 100. When the area of the second external electrode 200 is equal to or greater than the area of the first external electrode 111 on the perimetric surface, the stray capacitance is generated between the first and second parts 210 and 220 of the second external electrode 200 and the internal electrodes 121 and 122, and such a stray capacitance causes deviation of capacitance. In particular, in high-band frequencies such as 5G, even a slight deviation of capacitance greatly affects circuit characteristics, and thus it is important to suppress the stray capacitance that may occur between the second external electrode 200 and the internal electrodes 121 and 122. Therefore, according to the present disclosure, by reducing the areas in which the first and second parts 210 and 220 of the second external electrode 200 and the internal electrodes 121 and 122 face, it is possible to suppress the occurrence of stray capacitance and reduce the deviation of capacitance.

The second external electrode 200 may be formed by transferring conductive paste using a wheel. A termination method using a wheel has an advantage that the conductive paste may be transferred thinly or thickly by adjusting a pressure of the wheel using an elastic wheel, thereby making it easy to adjust the thickness.

Although not shown, the second external electrode 200 may be formed of a plurality of layers (not shown). As an example, the plurality of layers forming the second external electrode 200 may have the form that is in contact with each of the first and second internal electrodes 121 and 122 exposed through the first cross section 103 and the second cross section 104 of the ceramic body 100 and has a first layer containing Cu, a second layer containing an Ag epoxy, and a third layer containing Ni or Sn that are sequentially stacked. In this case, since the Ag epoxy contained in the second layer is a conductive material having flexibility and elasticity, it is effective in preventing cracks by serving as a cushion for mitigating an impact in an environment having a large stress change.

As described above, in the ceramic capacitor 1 according to one embodiment of the present disclosure, by increasing the areas of the first external electrodes 111 disposed at both sides of at least one of the top surface 101 and the bottom surface 102 of the ceramic body 100, it is possible to reinforce the intensity of the capacitor, thereby preventing the occurrence of cracks caused by the stress concentrated on both lower sides of the ceramic body 100 upon bonding by soldering. In addition, since the second external electrode 200 is formed to have a smaller area than the first external electrode 111 on the top surface 101 and the bottom surface 102 of the ceramic body 100, it is possible to reduce the areas of the second external electrode 200 and the internal electrodes 121 and 122 facing each other and suppress the stray capacitance that may be generated between the second external electrode 200 and the internal electrodes 121 and 122.

FIG. 4 is a perspective view showing a ceramic capacitor having a different ceramic body according to a modified example of one embodiment of the present disclosure.

As shown in FIG. 4, in one embodiment of the present disclosure, a ceramic capacitor 1A having a different ceramic body according to a modified example of one embodiment of the present disclosure includes the ceramic body 100 and the second external electrode 200. Here, the ceramic body 100 may further include a side electrode 300.

The side electrode 300 may be disposed at both sides of each of the first side surface 105 and the second side surface 106 facing each other in the width direction of the ceramic body 100. The side electrode 300 may be formed by printing an electrode made of Ag, Cu, or a mixed metal thereof at both sides of each of the first side surface 105 and the second side surface 106 after the stack of the plurality of dielectric layers 110, 120, and 130 is sintered. In addition, the side electrode 300 may be formed by compressing and cutting the stack of the plurality of dielectric layers 110, 120, and 130 and then printing the electrode material at both sides of the first side surface 105 and the second side surface 106. In this case, the side electrode 300 may be sintered simultaneously during the sintering process of the stack.

The side electrode 300 may be formed to control the length of the second external electrode 200 extending to the perimetric surface of the ceramic body 100 when the second external electrode 200 is formed. When the second external electrode 200 is formed by applying the conductive paste, the second external electrode 200 may be formed as much as a length covering the side electrode 300, which is a metal material, and the remaining area of the ceramic body 100 made of a dielectric material may be formed not to be covered. As described above, the side electrode 300 may serve as a guide of the second external electrode 200 so that the formation location and size of the second external electrode 200 may be controlled accurately.

Hereinafter, a ceramic capacitor according to another embodiment of the present disclosure will be described with reference to FIGS. 5 to 7. For convenience of description, the description of the same components as the embodiment shown in FIGS. 1 to 4 will be omitted, and the differences will be mainly described below.

FIG. 5 is a perspective view showing a ceramic capacitor according to another embodiment of the present disclosure, FIG. 6 is a perspective view showing a state in which a third external electrode is disassembled from FIG. 5, and FIG. 7 is a cross-sectional view along line A-A' in FIG. 5.

A ceramic capacitor 1' according to another embodiment of the present disclosure may further include a third external electrode 300' as shown in FIGS. 5 to 7.

The third external electrode 300' may be formed to cover each of a first cross section 103' and a second cross section 104' in which the second external electrode 200' is disposed. The third external electrode 300' may be formed by attaching a metal plate, such as Ag or Cu, to each of the first cross section 103' and the second cross section 104' using a conductive adhesive, or formed by fusing the metal plate using laser, ultrasonic waves, etc. When the third external electrode 300' formed of the metal plate is attached to each of the first and second cross sections 103' and 104', the third external electrode 300' may serve to support the first and second cross sections 103' and 104' of the ceramic body 100', it is possible to reduce vibrations caused by the piezoelectric phenomenon of the capacitor.

Alternatively, the third external electrode 300' may be formed by depositing the electrode material such as Ag or Cu on each of the first cross section 103' and the second cross section 104' using a sputtering method. When the third external electrode 300' is formed by the sputtering method, a composition ratio and thickness of the third external electrode 300' may be easily adjusted.

Meanwhile, in the ceramic capacitor 1' according to another embodiment of the present disclosure, the second external electrode 200' may include a first part 210' and a second part 220'. The first part 210' of the second external electrode 200' is a part disposed on each of a top surface 101' and a bottom surface 102' to be in contact with the first external electrode 111'. The second part 220' of the second external electrode 200' is a part formed subsequent to the first part 210' and disposed on each of the first cross section 103' and the second cross section 104'.

That is, the first part 210' of the second external electrode 200' is a part that covers the first external electrode 111' disposed at both sides of the top surface 101' and the bottom surface 102' of the ceramic body 100, and the second part 220' of the second external electrode 200' is a part that covers the first cross section 103' and the second cross section 104' of the ceramic body 100'. Here, the first part 210' and the second part 220' of the second external electrode 200' have the same length in a width direction W of the ceramic body 100'. That is, as shown in FIG. 4, a length W1 of the first part 210' in the width direction W is equal to a length W2 of the second part 220' in the width direction W.

Since the second external electrode 200' is formed to have a shorter distance between each of the first cross section 103' and the second cross section 104' and one end portion of the second external electrode 200' than the first external electrode 111', the second external electrode 200' may be formed to have a smaller area than the first external electrode 111' on the top surface 101' and the bottom surface 102' of the ceramic body 100'.

When the area of the second external electrode 200' is equal to or greater than the area of the first external electrode 111' on the top surface 101' and the bottom surface 102', the stray capacitance is generated between the first part 210' of the second external electrode 200' and internal electrodes 121' and 122', and such a stray capacitance causes deviation of capacitance. In particular, in high-band frequencies such as 5G, even a slight deviation of capacitance greatly affects circuit characteristics, and thus it is important to suppress the stray capacitance that may occur between the second external electrode 200' and the internal electrodes 121' and 122'. Therefore, according to the present disclosure, by reducing the areas in which the first part 210' of the second external electrode 200' and the internal electrodes 121' and 122' face, it is possible to suppress the occurrence of stray capacitance and reduce the deviation of capacitance.

The second external electrode 200' may be disposed at a central portion of the ceramic body 100' in the width direction on each of the first cross section 103' and the second cross section 104'. The second external electrode 200' is not formed to extend to the first side surface 105' and the second side surface 106'. That is, the ceramic capacitor 1' according to another embodiment of the present disclosure may be formed to prevent the second external electrode 200' from extending to the first and second side surfaces 105' and 106' to minimize the deviation of capacitance caused by the stray capacitance between the portion of the second external electrode 200' and the internal electrodes 121' and 122'.

In the ceramic capacitor 1' according to another embodiment of the present disclosure, since the third external electrode 300' is formed to cover each of the first cross section 103' and the second cross section 104' in a state in which the second external electrode 200' is disposed on each of the first and second cross sections 103' and 104' and the top and bottom surfaces 101' and 102', the external electrode 300' is easily formed not to extend to the first side surface 105' and the second side surface 106'. That is, in the ceramic capacitor 1' according to another embodiment of the present disclosure, since the third external electrode 300' is formed to cover each of the first cross section 103' and the second cross section 104' after the second external electrode 200' is thinly formed to have the lengths W1 and W2 in the width direction W, the external electrode is easily formed not to extend to the first and second side surfaces 105' and 106'. In addition, since the third external electrode 300' may serve to support the first and second cross sections 103' and 104' of the ceramic body 100', it is possible to reduce vibrations caused by the piezoelectric phenomenon of the capacitor.

FIG. 8 is a perspective view showing a ceramic capacitor having a different second external electrode according to a modified example of another embodiment of the present disclosure, and FIG. 9 is a perspective view showing a state in which a third external electrode is disassembled from FIG. 8.

As shown in FIGS. 8 and 9, a ceramic capacitor 1A' according to another embodiment of the present disclosure includes the ceramic body 100', the second external electrode 200', and the third external electrode 300'. Here, the length of the second external electrode 200' in the width direction of the ceramic body 100' is equal to that of the first external electrode 111'. In this case, since the first part 210' and the second part 220' of the second external electrode 200' each has the same length in the width direction of the ceramic body 100', the second external electrode 200' does not extend to the first and second side surfaces 105' and 106', and may be formed to surround each of the first cross section 103' and the second cross section 104' and the top surface 101' and the bottom surface 102' at the edge adjacent to each of the first cross section 103' and the second cross section 104'. As described above, in the ceramic capacitor 1A', since the length of the second external electrode 200' in the width direction W is equal to that of the first external electrode 111', the second external electrode 200' has an increased force of supporting both sides of the ceramic body 100', thereby reinforcing the intensity of the capacitor.

FIG. 10 is a view for describing a method of manufacturing the ceramic capacitor according to one embodiment of the present disclosure, and FIG. 11 is a view for describing a method of manufacturing the ceramic capacitor having the different ceramic body according to the modified example of one embodiment of the present disclosure.

As shown in FIG. 10, the method of manufacturing the ceramic capacitor according to one embodiment of the present disclosure may include manufacturing a ceramic body 100 including a plurality of dielectric layers 110, 120, and 130 and the internal electrodes 121 and 122 and having the first external electrodes 111 disposed at both sides of at least one of the top surface 101 and the bottom surface 102 (S10), and forming the second external electrode 200 disposed on each of the first cross section 103 and the second cross section 104 facing each other in the longitudinal direction of the ceramic body 100 and extending to the top surface 101 and the bottom surface 102 to be in contact with the first external electrode 111 (S20). In the forming of the second external electrode 200 (S20), the second external electrode 200 may be formed to surround the first cross section 103 and the second cross section 104 and a perimetric surface of an edge adjacent to each of the first cross section 103 and the second cross section 104.

As shown in FIGS. 2 and 10, the manufacturing of the ceramic body 100 (S10) may include forming a stack including the plurality of first dielectric layers 110 in which the first external electrodes 111 are disposed at both sides of one of the top surface 101 and the bottom surface 102, the plurality of second dielectric layers 120 on which the internal electrodes 121 and 122 are disposed, and the plurality of third dielectric layers 130 made of only a dielectric, and compressing, cutting, and sintering the stack.

In the forming of the stack, the first dielectric layer 110 having the first external electrodes 111 formed at both sides of the top surface 101 may be disposed at the uppermost portion of the ceramic body 100, and the first dielectric layer 110 having the first external electrodes 111 formed at both sides of the bottom surface 102 may be disposed at the lowermost portion of the ceramic body 100.

In the forming of the stack, each of the first dielectric layers 110 on which the first external electrodes 111 are disposed may be formed by printing one of Ag and Cu or a mixture thereof at both sides of one of the top surface 101 and the bottom surface 102 of the ceramic sheet.

Conventionally, the external electrode is formed by dipping both end portions of the ceramic body 100 into paste, and the dipping method has a disadvantage in that it is difficult to accurately control the dipping depth. On the other hand, according to the present disclosure, since the first external electrode 111 is formed by being printed on the ceramic sheet, the formation location and size of the first external electrode 111 may be controlled accurately. In addition, the interval between the first external electrodes 111 disposed at both sides on the same plane may also be controlled accurately, thereby reducing the deviation of capacitance.

In the forming of the stack, the plurality of second dielectric layers 120 on which the internal electrodes are disposed may be disposed between the first dielectric layers 110, and the plurality of third dielectric layers 130 formed of only a dielectric may be formed between the first dielectric layer 110 and the second dielectric layer 120. Here, the third dielectric layer 130 may be disposed to secure an appropriate interval between the first dielectric layer 110 and the second dielectric layer 120, thereby suppressing a stray capacitance generated between the first external electrode 111 disposed on the first dielectric layer 110 and the internal electrodes 121 and 122 disposed on the second dielectric layer 120.

In the forming of the second external electrode 200 (S20), the second external electrode 200 may be formed to have a shorter distance between each of the first cross section 103 and the second cross section 104 and one end portion thereof than the first external electrode 111. That is, the second external electrode 200 may be formed to have a smaller area than the first external electrode 111 on the perimetric surfaces of the ceramic body 100. When the area of the second external electrode 200 is equal to or greater than the area of the first external electrode 111 on the perimetric surface, the stray capacitance is generated between the first and second parts 210 and 220 of the second external electrode 200 and the internal electrodes 121 and 122, and such a stray capacitance causes deviation of capacitance. Therefore, according to the present disclosure, by reducing the areas in which the first and second parts 210 and 220 of the second external electrode 200 and the internal electrodes 121 and 122 face, it is possible to suppress the occurrence of stray capacitance and reduce the deviation of capacitance.

In the forming of the second external electrode 200 (S20), the second external electrode 200 may be formed by transferring the conductive paste using a wheel. A termination method using a wheel has an advantage that the conductive paste may be transferred thinly or thickly by adjusting a pressure of the wheel using an elastic wheel, thereby making it easy to adjust the thickness.

Referring to FIG. 11, the manufacturing of the ceramic body 100 (S10) may include forming the side electrodes 300 at both sides of each of the first side surface 105 and the second side surface 106 facing each other in the width direction of the ceramic body 100. The side electrode 300 may be formed by printing an electrode made of Ag, Cu, or a mixed metal thereof at both sides of each of the first side surface 105 and the second side surface 106 after the sintering operation.

Alternatively, the side electrode 300 may be formed in the sintering operation. That is, in the sintering operation, the stack in which the plurality of first to third dielectric layers 130 are stacked may be compressed and cut, and then the electrode materials may be printed at both sides of each of a pair of side surfaces facing each other in the width direction of the stack. In this case, the side electrode 300 may be sintered simultaneously during the sintering process of the stack.

The side electrode 300 may be formed to control the length of the second external electrode 200 extending to the perimetric surface of the ceramic body 100 in the forming of the second external electrode 200 (S20). When the second external electrode 200 is formed by applying the conductive paste, the second external electrode 200 may be formed as much as a length covering the side electrode 300, which is a metal material, and the remaining area of the ceramic body made of a dielectric material may be formed not to be covered. As described above, the side electrode 300 may serve as a guide of the second external electrode 200 so that the formation location and size of the second external electrode 200 may be controlled accurately.

FIG. 12 is a view for describing a method of manufacturing a ceramic capacitor according to another embodiment of the present disclosure.

Referring to FIG. 12, in the method of manufacturing the ceramic capacitor according to another embodiment of the present disclosure, the forming of the second external electrode 200' (S20) may include arranging the second external electrode 200' on the central portion of the ceramic body 100' in the width direction at each of the first cross section 103' and the second cross section 104'. The second external electrode 200' is not formed to extend to the first side surface 105' and the second side surface 106'. That is, the ceramic capacitor 1' according to another embodiment of the present disclosure may be formed to prevent the second external electrode 200' from extending to the first and second side surfaces 105' and 106' to minimize the deviation of capacitance caused by the stray capacitance between the portion of the second external electrode 200' and the internal electrodes 121' and 122'.

Meanwhile, in the forming of the second external electrodes 200', as shown in FIGS. 8 and 9, the second external electrode 200' may be formed to surround each of the first cross section 103' and the second cross section 104' and the top surface 101' and the bottom surface 102' at the edge adjacent to each of the first cross section 103' and the second cross section 104'.

A method of manufacturing a ceramic capacitor according to another embodiment of the present disclosure may further include forming the third external electrode 300' to cover each of the first cross section 103' and the second cross section 104' on which the second external electrode 200' is disposed (S30).

In the forming of the third external electrode 300' (S30), the third external electrode 300' may be formed by attaching the metal plate to each of the first cross section 103' and the second cross section 104' using a conductive adhesive, or fusing the metal plate using laser, ultrasonic waves, etc. As described above, when the third external electrode 300' is formed of the metal plate and attached to the first and second cross sections 103' and 104', the third external electrode 300' formed of the metal plate may serve to support the first and second cross sections 103' and 104' of the ceramic body 100', and thus it is possible to reduce vibrations caused by the piezoelectric phenomenon of the capacitor.

Alternatively, in the forming of the third external electrode (S30), the third external electrode 300' may be formed by depositing the electrode material on each of the first cross section 103' and the second cross section 104' using a sputtering method. As described above, when the third external electrode 300' is formed by the sputtering method, the composition ratio and thickness of the third external electrode 300' may be easily adjusted.

The above description is merely the exemplary description of the technical spirit of the present disclosure, and those skilled in the art to which the present disclosure pertains will be able to variously modify and change the present disclosure without departing from the essential characteristics of the present disclosure. Therefore, the embodiments disclosed in the present disclosure are not intended to limit the technical spirit of the present disclosure, but intended to describe the same, and the scope of the technical spirit of the present disclosure is not limited by these embodiments. The scope of the present disclosure should be construed according to the appended claims, and all technical spirits within the equivalent range should be construed as being included in the scope of the present disclosure.

The invention claimed is:

1. A method of manufacturing a ceramic capacitor, comprising:

manufacturing a ceramic body including a plurality of dielectric layers and internal electrodes and having first external electrodes disposed at both sides of at least one of a top surface and a bottom surface; and forming a second external electrode disposed on at least a portion of each of a first cross section and a second cross section facing each other in a longitudinal direction of the ceramic body and extending to the top surface and the bottom surface to be in contact with the first external electrode, wherein the manufacturing of the ceramic body further includes forming side electrodes at both sides of each of a first side surface and a second side surface facing each other in a width direction of the ceramic body, and wherein in the forming of the second external electrode, the second external electrode is formed to have a shorter distance between each of the first cross section and the second cross section and one end portion thereof than the first external electrode, and the second external electrode is formed as much as a length covering the side electrode on the first side surface and the second side surface.

2. The method of claim 1, wherein in the forming of the second external electrode, the second external electrode is formed to surround the first cross section and the second cross section, and a perimetric surface of an edge adjacent to each of the first cross section and the second cross section.

3. The method of claim 2, wherein the manufacturing of the ceramic body includes:

forming a stack including a plurality of first dielectric layers having the first external electrodes at both sides of one of top and bottom surfaces thereof, a plurality of second dielectric layers having internal electrodes disposed thereon, and a plurality of third dielectric layers formed of only a dielectric layer; and compressing, cutting, and sintering the stack.

4. The method of claim 3, wherein in the forming of the stack, the first dielectric layer on which the first external electrodes are disposed at both sides of the top surface thereof is disposed on an uppermost portion, and the first dielectric layer on which the first external electrodes are disposed at both side of the bottom surface thereof is disposed on a lowermost portion.

5. The method of claim 4, wherein in the forming of the stack, the plurality of second dielectric layers on which the internal electrodes are disposed are disposed between the first dielectric layers, and the plurality of third dielectric layers formed of only the dielectric layer are disposed between the first dielectric layer and the second dielectric layer.

6. The method of claim 3, wherein in the sintering, after the stack is compressed and cut, side electrodes are formed at both sides of each of a pair of side surfaces facing each other in a width direction, and the stack and the side electrode are sintered at the same time.

7. The method of claim 3, wherein in the forming of the stack, each of the first dielectric layers on which the first external electrode is disposed is formed by printing an electrode material that is one of Ag and Cu, or a mixture thereof at both sides of one of top and bottom surfaces of a ceramic sheet.

8. The method of claim 1, further comprising forming a third external electrode to cover each of the first cross section and the second cross section on which the second external electrode is disposed.

9. The method of claim 8, wherein the forming of the third external electrode includes forming the third external electrode by attaching a metal plate on each of the first cross section and the second cross section using a conductive adhesive.

10. The method of claim 8, wherein the forming of the third external electrode includes forming the third external electrode by depositing an electrode material on each of the first cross section and the second cross section in a sputtering method.

11. A ceramic capacitor comprising:

a ceramic body including a plurality of dielectric layers and internal electrodes and having first external electrodes disposed at both sides of at least one of a top surface and a bottom surface; and a second external electrode disposed on at least a portion of each of a first cross section and a second cross section facing each other in a longitudinal direction of the ceramic body and extending to the top surface and the bottom surface to be in contact with the first external electrode, wherein the ceramic body further includes side electrodes disposed at both sides of each of a first side surface and a second side surface facing each other in a width direction of the ceramic body, and wherein the second external electrode is formed to have a shorter distance between each of the first cross section and the second cross section and one end portion thereof than the first external electrode, and the second external electrode is formed as much as a length covering the side electrode on the first side surface and the second side surface.

12. The ceramic capacitor of claim 11, wherein the second external electrode is formed to surround the first cross section and the second cross section, and a perimetric surface of an edge adjacent to each of the first cross section and the second cross section.

13. The ceramic capacitor of claim 12, wherein the second external electrode includes:

a first part disposed on each of the top surface and the bottom surface to be in contact with the first external electrode;

a second part formed subsequent to the first part and disposed on each of a first side surface and a second side surface facing each other in a width direction of the ceramic body; and a third part formed subsequent to the second part and disposed on each of the first cross section and the second cross section, and the first part and the second part have the same width in a longitudinal direction of the ceramic body.

14. The ceramic capacitor of claim 11, wherein an interval between the first external electrodes in a longitudinal direction of the ceramic body is shorter than an interval between the second external electrodes.

15. The ceramic capacitor of claim 11, further comprising a third external electrode formed to cover each of the first cross section and the second cross section on which the second external electrode is disposed.

16. The ceramic capacitor of claim 15, wherein the second external electrode is disposed on a central portion of the ceramic body in a width direction on each of the first cross section and the second cross section.

17. The ceramic capacitor of claim 15, wherein the second external electrode includes:

a first part disposed on each of the top surface and the bottom surface to be in contact with the first external electrode; and a second part formed subsequent to the first part and disposed on each of the first cross section and the second cross section, and the first part and the second part have the same length in a width direction of the ceramic body.

18. The ceramic capacitor of claim 15, wherein the second external electrode has the same length in the width direction of the ceramic body as the first external electrode.

* * * * *